United States Patent
Schmitz et al.

(10) Patent No.: US 9,436,172 B2
(45) Date of Patent: Sep. 6, 2016

(54) TEST INSTALLATION FOR TESTING CONTROL PROGRAMS FOR A ROBOT INSTALLATION

(75) Inventors: Sandra Schmitz, Ludwigsburg (DE); Gerhard Alonso Garcia, Bönnigheim (DE); Michael Fella, Leutenbach (DE)

(73) Assignee: Duerr Systems GmbH, Bietighei-Bissingen (DE)

( * ) Notice: Subject to any disclaimer, the term of this patent is extended or adjusted under 35 U.S.C. 154(b) by 289 days.

(21) Appl. No.: 13/574,451

(22) PCT Filed: Jan. 17, 2011

(86) PCT No.: PCT/EP2011/000169
§ 371 (c)(1),
(2), (4) Date: Oct. 31, 2012

(87) PCT Pub. No.: WO2011/088979
PCT Pub. Date: Jul. 28, 2011

(65) Prior Publication Data
US 2013/0060378 A1    Mar. 7, 2013

(30) Foreign Application Priority Data

Jan. 21, 2010   (DE) .................. 10 2010 005 308

(51) Int. Cl.
*G05B 17/02*    (2006.01)
(52) U.S. Cl.
CPC ..... *G05B 17/02* (2013.01); *G05B 2219/23446* (2013.01); *Y02P 90/26* (2015.11)
(58) Field of Classification Search
CPC .......... G05B 2219/23293; G05B 2219/23389; G05B 2219/31076; G05B 2219/40129; G05B 2219/13174; G05B 2219/13186; G06F 17/5009; G06F 3/048; G06F 17/50; G06F 11/261; G06F 17/00; G06F 11/2273; G06F 8/20; G06F 9/46; G06F 19/00
See application file for complete search history.

(56) References Cited

U.S. PATENT DOCUMENTS 6,684,182 B1 * 1/2004 Gold et al. ........................ 703/8
6,918,061 B2    7/2005 Grohmann et al.
(Continued)

FOREIGN PATENT DOCUMENTS

CN    1511669 A    7/2004
CN    101118440 A    2/2008
(Continued)

OTHER PUBLICATIONS

Fieldbus.pdf (fieldbus Definition from PC Magazine Encyclopedia, http://www.pcmag.com/encyclopedia/term/43143/fieldbus, Sep. 24, 2014, pp. 1-4).*

(Continued)

*Primary Examiner* — Bao Long T Nguyen
(74) *Attorney, Agent, or Firm* — Bejin Bieneman PLC

(57) ABSTRACT

The invention relates to a test installation for testing control programs for a real robot installation, particularly for a lacquering installation, having a plurality of robot controllers (2.1-2.*n*), which each contain a control program and correspond to robot controllers (2.1-2.*n*) in the real robot installation, at least one control unit (4) for co-ordinating the robot controllers (2.1-2.*n*), wherein the control unit (4) contains a control program and corresponds to a control unit (4) in the real robot installation, and also having a first data bus (3) which connects the robot controllers (2.1-2.*n*) to one another and/or to the control unit (4), wherein the first data bus (3) corresponds to a data bus in the real robot installation. It is proposed that the test installation additionally have a modelling device (9) which is connected to the first data bus (3) and simulates peripheral components of the real robot installation, so that the control programs can be tested without the peripheral components. The invention also comprises an appropriate test method.

9 Claims, 7 Drawing Sheets

(56) References Cited

U.S. PATENT DOCUMENTS

| | | | |
|---|---|---|---|
| 6,944,584 B1* | 9/2005 | Tenney et al. | 703/22 |
| 7,137,107 B1* | 11/2006 | Brown | 717/137 |
| 7,525,274 B2 | 4/2009 | Kazi et al. | |
| 8,170,861 B2* | 5/2012 | Tilove et al. | 703/23 |
| 8,370,124 B1* | 2/2013 | Gold et al. | 703/23 |
| 8,567,694 B2 | 10/2013 | Herre | |
| 2003/0150218 A1 | 8/2003 | Ovshinsky | |
| 2006/0069541 A1* | 3/2006 | Walacavage et al. | 703/22 |
| 2006/0106492 A1 | 5/2006 | Gerat et al. | |
| 2006/0178778 A1* | 8/2006 | Fuhlbrigge et al. | 700/264 |
| 2008/0009964 A1* | 1/2008 | Bruemmer et al. | 700/245 |
| 2009/0326904 A1* | 12/2009 | English et al. | 703/17 |
| 2010/0017026 A1* | 1/2010 | Fletcher et al. | 700/245 |
| 2010/0151227 A1 | 6/2010 | Donatti et al. | |
| 2010/0174395 A1* | 7/2010 | Gu et al. | 700/110 |
| 2010/0274378 A1 | 10/2010 | Herre | |

FOREIGN PATENT DOCUMENTS

| | | |
|---|---|---|
| DE | 10037396 A1 | 2/2002 |
| DE | 10314025 A1 | 10/2004 |
| JP | H 07-064618 | 3/1995 |
| JP | 2000-267706 | 9/2000 |
| JP | 2002318607 A | 10/2002 |
| JP | 2003-117863 | 4/2003 |
| JP | 2003150218 A | 5/2003 |
| JP | 2003-316405 | 11/2003 |
| JP | 2007036516 A | 2/2007 |
| JP | 2009038876 A1 | 2/2009 |
| JP | 2010143221 A | 7/2010 |
| WO | 2009017009 A1 | 2/2009 |
| WO | 2009083087 A1 | 7/2009 |

OTHER PUBLICATIONS

Connect_Definition of connect by Merriam-Webster.pdf (Connect | Definition of connect by Merriam-Webster, Dec. 16, 2015, http://www.merriam-webster.com/dictionary/connect, pp. 1-8).*

International Search Report, PCT/ISA/210, Apr. 20, 2011, 21 pages (English translation included).

Broekman, B., "Testing Embedded Software," Edition 1, London: Addison-Wesley, 2003, pp. 193-208.

Hering, E., et al., "Grundwissen des Ingenieurs," Edition 14, Munich: Carl Hansen Verlag, 2007, p. 189.

Scheifele, D., "Effizient Automatisieren mit Virtuellen Maschinen," IFF Wissenschaftstage 16 18, Jun. 2009, Magdeburg.

NN "Virtuos virtuelle Maschinen und Anlagen," ISG Industrielle Steuerungstechnik GmbH, Jul. 2009.

Ehrenstrasser/Poernbacher, Wuensch, "Hardware-in-the-Loop Simulation of Machine Tools," imb Newsletter 2002, No. 4, pp. 6-8.

* cited by examiner

TEST INSTALLATION FOR TESTING CONTROL PROGRAMS FOR A ROBOT INSTALLATION

This application is a National Stage application which claims the benefit of International Application No. PCT/EP2011/000169 filed Jan. 17, 2011, which claims priority based on German Application No. DE 10 2010 005 308.2, filed Jan. 21, 2010, both of which are hereby incorporated by reference in their entireties.

Disclosed herein is a test installation for testing control programs for a robot system, in particular for a painting installation. The test installation is suitable for all installations in the area of surface engineering, such as interior painting, external painting, handling robots (for example door openers, hood openers), sealing, gluing, seam sealing and underbody protection. A corresponding test method is further disclosed.

Figure 7:
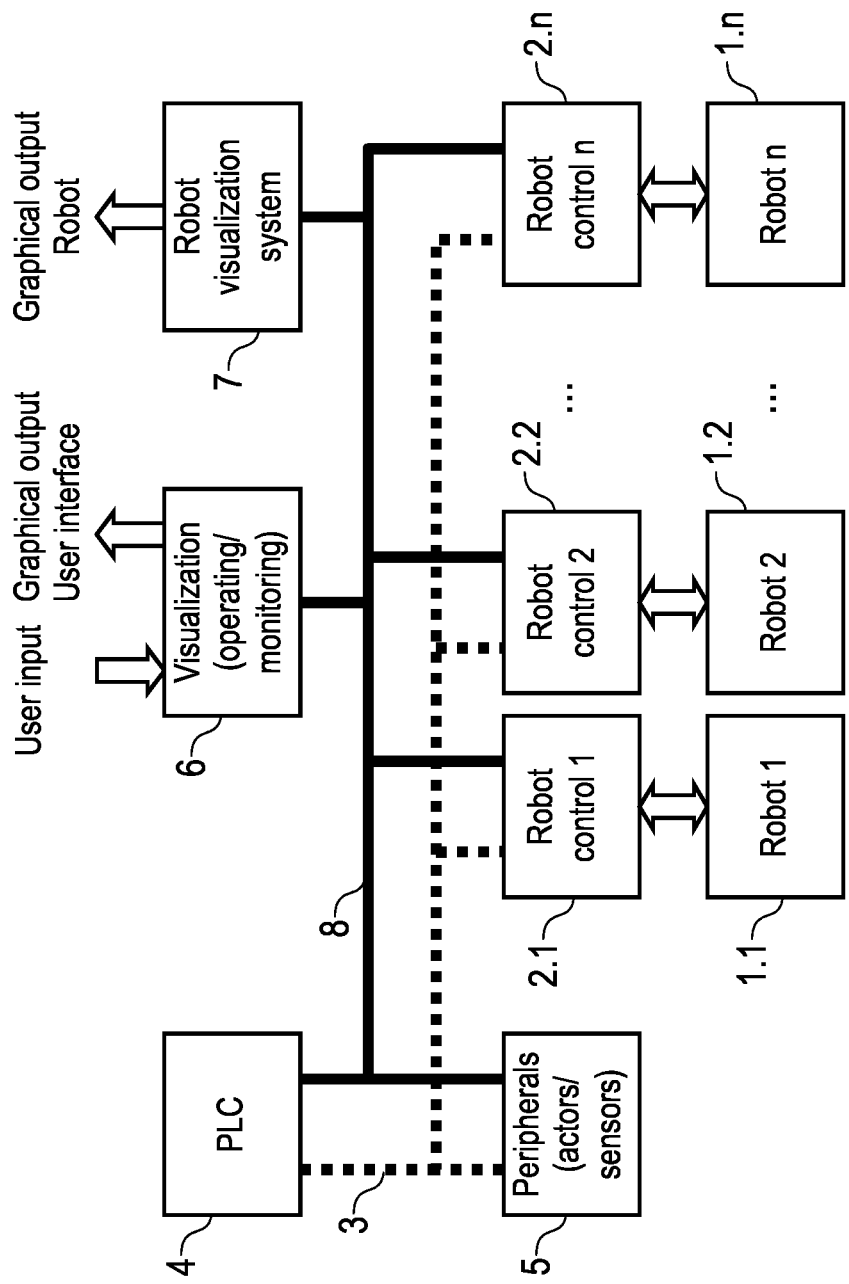

FIG. 7 shows a schematic diagram of a conventional painting installation with a plurality of robots $1.1, 1.2, \ldots, 1.n$, wherein these can be painting robots, handling robots (for example door openers, hood openers) or sealing robots, which can, for example, apply a sealant to a flange weld on a motor vehicle body component.

There are only three robots $1.1, 1.2, \ldots, 1.n$ shown in the drawing but, in principle, the painting installation can have any number of robots.

Every robot $1.1, 1.2, \ldots, 1.n$ is respectively actuated by a robot control $2.1, 2.2, \ldots, 2.n$, wherein the communication between the robot controls $2.1, 2.2, \ldots, 2.n$ on the one hand and the robots $1.1, 1.2, \ldots, 1.n$ on the other hand takes place bidirectionally. On the one hand, the robot controls $2.1, 2.2, \ldots, 2.n$ send control commands to the robots $1.1, 1.2, \ldots, 1.n$ in order to obtain the desired robot settings so that the TCP (Tool Center Point) of the robots $1.1, 1.2, \ldots, 1.n$ moves on the programmed path. On the other hand, the robots $1.1, 1.2, \ldots, 1.n$ include also sensors (for example, axial sensors which measure the position of the individual robot axes) and send corresponding measurement values to the robot controls $2.1, 2.2, \ldots, 2.n$.

The individual robot controls $2.1, 2.2, \ldots, 2.n$ are connected to a field bus 3 which is connected with a central control unit 4 in the form of a Programmable Logic Controller (PLC: Programmable Logic Controller). The central control unit 4 coordinates the various robot controls $2.1, 2.2, \ldots, 2.n$ in order, for example, to secure synchronous operation and to avoid collisions between the robots $1.1, 1.2, \ldots, 1.n$.

Furthermore, the painting installation also has peripheral components 5, which are only shown schematically in the drawing as an individual component and which are also connected to the field bus 3. The peripheral components 5 can, for example, be actors or sensors in the painting installation which influence operation of the painting installation. Examples of such peripheral components are components of the cabin and conveyor system, a compressed air supply or a fire protection system.

The painting installation also has an operator computer 6, which offers a graphical user interface and, therefore, allows simple operation of the painting installation. On the one hand, the operator computer 6 receives operator input from the personnel operating the painting installation which, for example, can occur using the touchscreen, through a keyboard or by using any other data entry devices. On the other hand, the operator computer 6 offers a graphical output on the screen in order to simplify operation. Visualization software can be installed on the operator computer 6 such as INTOUCH™, WINNCC™, ZENON™, or EcoScreen-WEB™.

Furthermore, the painting installation is fitted with a graphics computer 7 on which a robot visualization system is installed, which correspondingly visualizes the respective robot position of robots $1.1, 1.2, \ldots, 1.n$ and therefore displays these graphically.

The conventional painting installation has an Ethernet data bus 8, which connects the robot controls $2.1, 2.2, \ldots, 2.n$ together and with the peripheral components 5, the central control unit 4 (PLC), the operator computer 6 and the graphics computer 7.

Operation of the painting installation is controlled by the control programs which are stored in the robot controls $2.1, 2.2, \ldots, 2.n$, in the central control unit 4, in the operator computer 6 and in the graphics computer 7. When developing a new painting installation according to customer-specific requirements, it is necessary for these control programs to be correspondingly adapted and tested, wherefore various options are used.

In a first test phase, the individual control programs are individually tested in the various sub-systems. This means, for example, that a control program for the robot control 2.1 is tested separately from the whole painting installation. The disadvantage of this first test phase is that the interaction of the control programs with the other sub-systems of the painting installation is not taken into account. One further disadvantage is that the control program can often only be tested statically and not dynamically. Particularly the safety-oriented parts of the program cannot be fully tested.

In a second test phase, there is testing of the control programs in the painting installation as part of the pre-commissioning work of the manufacturer. The disadvantage of this test phase is, on the one hand, the fact that only such operating conditions can be tested, which do not represent any kind of risk of damage for the painting installation, since the painting installation could otherwise be damaged during the testing. One further disadvantage of this test phase is that operation of the painting installation in the pre-commissioning phase for the manufacturer cannot totally reflect reality, which impairs the meaningfulness of this test phase.

Further, testing of the painting installation conventionally takes place as part of the commissioning at the customer's premises. The disadvantage of this test phase is, on the one hand, that testing of the control programs delays the plant commissioning work, that is the commissioning time is extended. On the one hand, software errors in this test phase can only still be removed by investing a great deal of effort. Furthermore, extreme operating conditions cannot be tested for in this test phase, since faults or damage may arise as a result.

From the prior art there is furthermore the so-called "Hardware in the Loop" test method known in which a mechatronic component is simulated in a overall system in order to be able also to test the whole system without the real mechatronic component being present. For example, one can refer in connection with this to the HiL test method at Hering/Modler: "Basic knowledge for engineers", 14th Edition, Carl Hanser Verlag 2007, pages 860, 1014-1016; DE 100 37 396 A1, Ehrenstrasser/Pörnbacher/Wünsch: "Hardware-in-the-Loop Simulation of Machine Tools", iwb Newsletter 2002, No. 4, pages 6-8 as well as DE 103 14 025 A1. This type of HiL test method was not, however, used until now in connection with painting installations.

In general, a test installation effectively simulates the function and structure of the real robot installation, wherein, however, peripheral components of the robot installation can be simulated by modelling equipment. This offers the advantage that the simulated or modelled peripheral components do not have to be present in the test installation.

Note that the real robot installation does not necessarily have to be a painting installation as was described above.

The disclosed principle is also usable for other robot installations, which are controlled by control programs.

Simulated or modelled peripheral components can, for example, be a conveyor system, which transports components in a robot installation (for example a painting installation) (for example motor vehicle body components) through the robot installation. Furthermore, in the presently-disclosed context, there is the possibility that the modelling equipment simulates or models a fire protection system. Another example of a peripheral component, which can be modelled using the test installation is an air-conditioning system in a painting cabin for a painting installation. It is furthermore also possible for the compressed air supply for the robot installation to be simulated or modelled by the modelling equipment. For example, the test operation may take place also without the real robots of the robot installation, which are then also simulated or modelled as peripheral components by the modelling equipment. In general the simulated or modelled peripheral components can be sensors (for example position sensors which measure the axial positions of the robot members of the robots) or actors (for example axial motors). There is furthermore also the possibility that components which are housed in the real robot installation in a robot control cabinet (for example drive controllers, power supplies, fuses, data bus components and terminals) can be simulated or modelled as peripheral components by the modelling equipment. The present disclosure is not, however, limited to the example described above with regard to the simulated or modelled peripheral components. The term peripheral component as used herein is intended to include all components in a robot installation, which directly or indirectly influence operation of the robot installation and, therefore, must be either present in reality as part of a test or must at least be simulated or modelled.

The structure of the test installation may be very similar to that of the real robot installation. Therefore, the test installation may have a plurality of robot controls, which each contain a control program and correspond to the robot controls in the real robot installation. Furthermore, the test installation may have at least one control unit (for example a Programmable Logic Controller) in order to coordinate the various robot controls, wherein the central control unit also contains a control program and corresponds to a control unit in the real robot installation. Furthermore, the test installation may be fitted with a first data bus which connects the robot controls with each other and/or with the control unit, wherein the first data bus represents a data bus from the real robot installation. The modelling equipment may be connected to the first data bus and may simulate peripheral components of the real robot installation so that the control program can be tested without the real peripheral components.

Furthermore, the test installation may have a graphics computer, which serves to provide a visualization of the robots of the robot installation, wherein the graphics computer in the test installation represents a graphics computer in the real robot installation. The graphics computer in the test installation may be connected with the robot controls and receives axial values from the robot controls, wherein the axial values represent the position of the individual robot axes of really present or simulated or modelled robots so that the graphics computer can reproduce the simulated movements of the robots on a screen. Using a robot visualization software running on the graphics computer it is therefore possible to visualize all robots in the modelled installation fully graphically in a three-dimensional representation on a conventional Personal Computer (PC) with substantially all of their movements so that the robot visualization software can animate the movements of the individual robots fully graphically.

Furthermore, the test installation may have an operator computer for operating and monitoring the simulated robot installation or the test installation, wherein the operator computer is preferably connected with the control unit and the individual robot controls, for example, via the first data bus or another data bus. The operator computer preferably contains a visualization software such as INTOUCH™, WINNCC™, ZENON™ or EcoScreenWEB™, wherein the visualization software offers a graphical user interface.

The first data bus mentioned above may be a field bus, which may connect the robot controls together and with the modelling equipment as well as with the control unit (e.g. a PLC). Furthermore, there may be a second data bus provided (for example Ethernet), which connects the robot controls together and with the control unit as well as with the operator computer and the graphics computer.

It was already briefly mentioned above that the test installation may work without the robots, which are present in the real robot installation. This offers the advantage that the construction of the test installation may be significantly simplified. The influence of the real robots on operation of the painting installation must therefore be modelled or simulated in the test installation. One option for this is that the control program for the robot controls simulates sensors and actors which are contained in the robots. Another option is that the modelling equipment is connected in each case to the robot controls in the test installation, which modelling equipment simulates or models the respective robot.

In one variation, the test installation for each robot control on the real robot installation contains a corresponding robot control so that the structure of the test installation essentially corresponds to the structure of the real robot installation. In another variation the test installation includes only one robot control on which a multi-robotic software is running which can simulate a control for all robots in the real robot installation.

Apart from the test installation, further disclosed herein is a corresponding test method through which the peripheral components of the real robot installation are modelled so that the test method manages without the real peripheral components.

Furthermore, it is possible, as part of the test method, to prescribe test procedures, wherein a defined series of operator entries can be made one after the other over time as part of the prescribed test procedures and/or the resulting operating conditions can be run. In this way, it is also possible to discover any errors which would only occur for a particular sequence of operator entries made one after the other over time and/or for the resulting operating conditions.

The test method is also very suitable for training and documentation purposes.

As part of a training session, operating personnel of the robot installation can, for example, be familiarized with the robot installation and its operating behavior without the simulated or modelled peripheral components (for example the robots) having to be really there. This advantageously also offers the option that extreme operating conditions can be simulated, which would be associated in real operation of the robot installation with an excessively high operating risk. Furthermore, a trainer can activate defined fault conditions of the robot installation in a targeted manner and can then observe the reaction of the operating personnel. In this way, future operating personnel can also be prepared in a targeted manner for fault scenarios.

The test method is also very suitable for documentation purposes if, for example, a technical editor creates an operating manual for the painting installation. The technical editor can then set up certain conditions for the robot installation in a targeted manner and then produce screenshots, which will be adopted in the operating manual for the robot installation.

Figure 1:
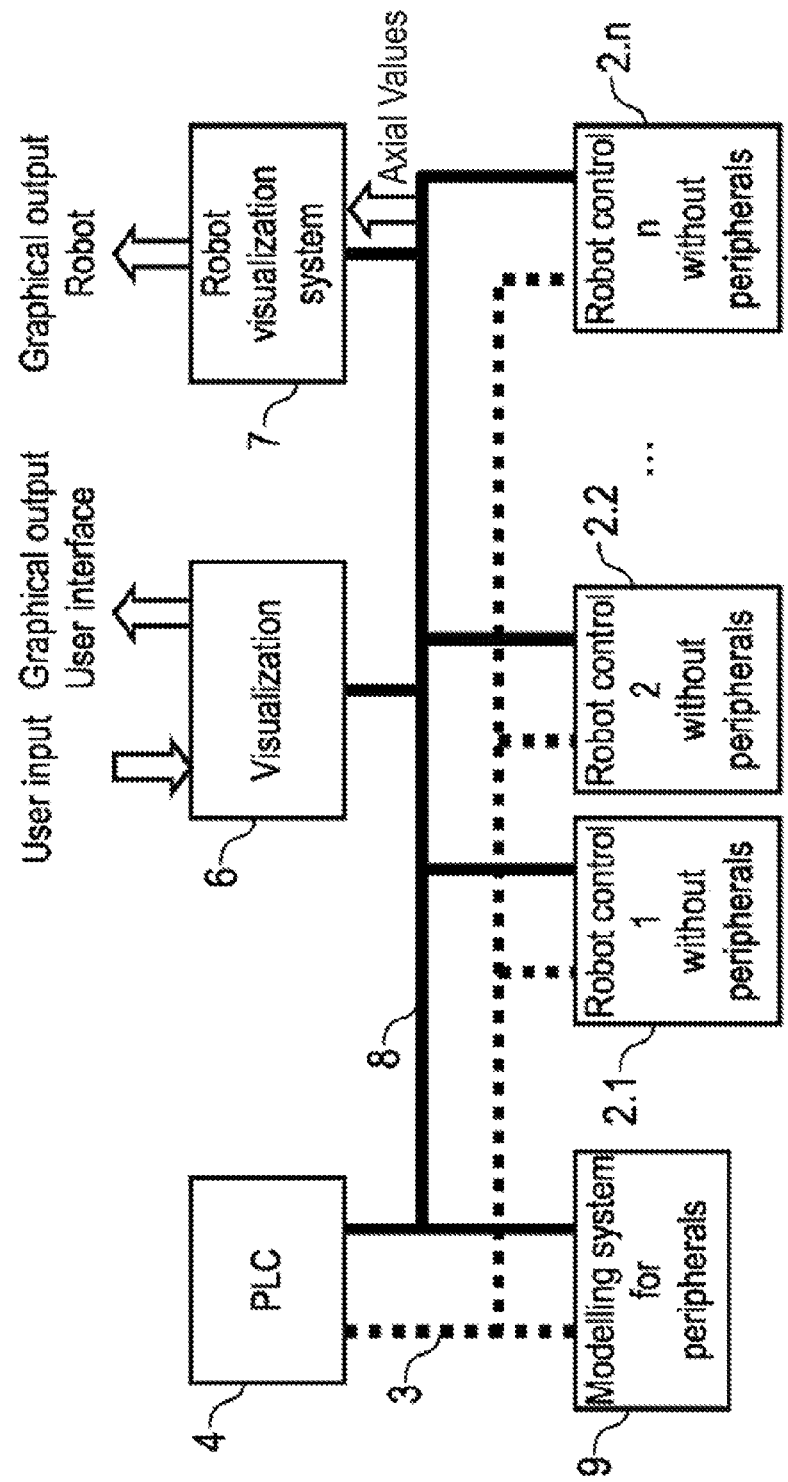
Figure 2:
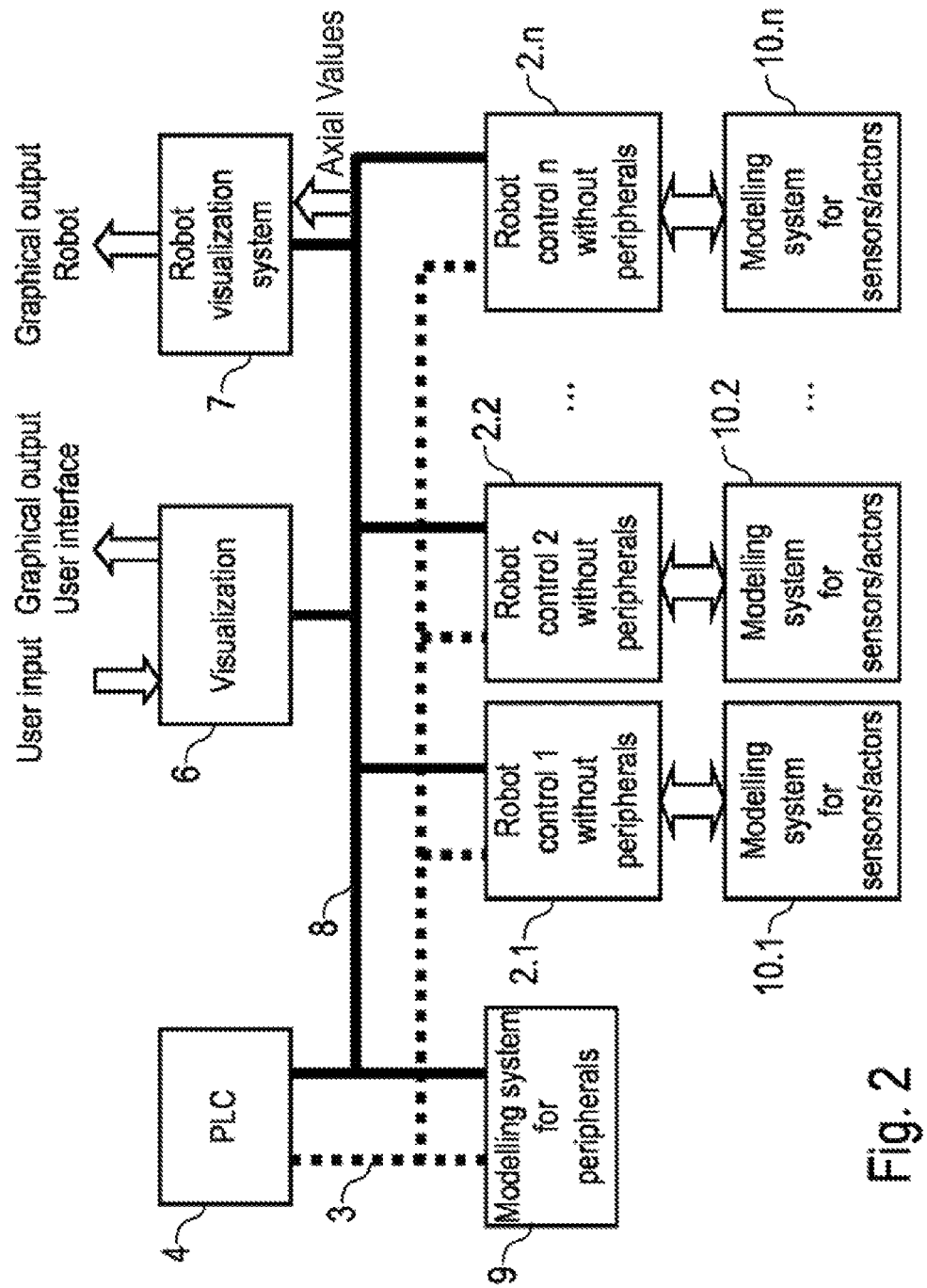
Figure 3:
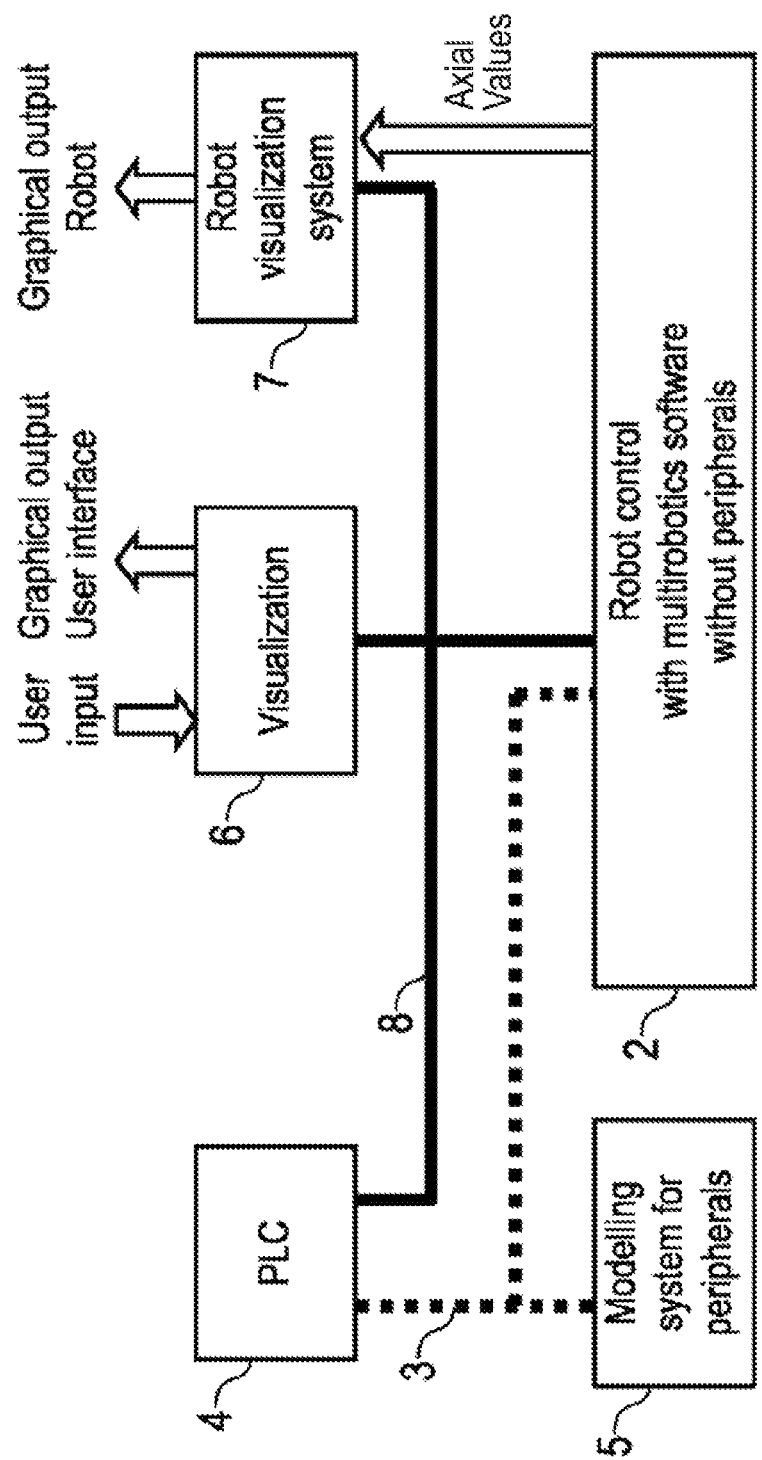
Figure 4:
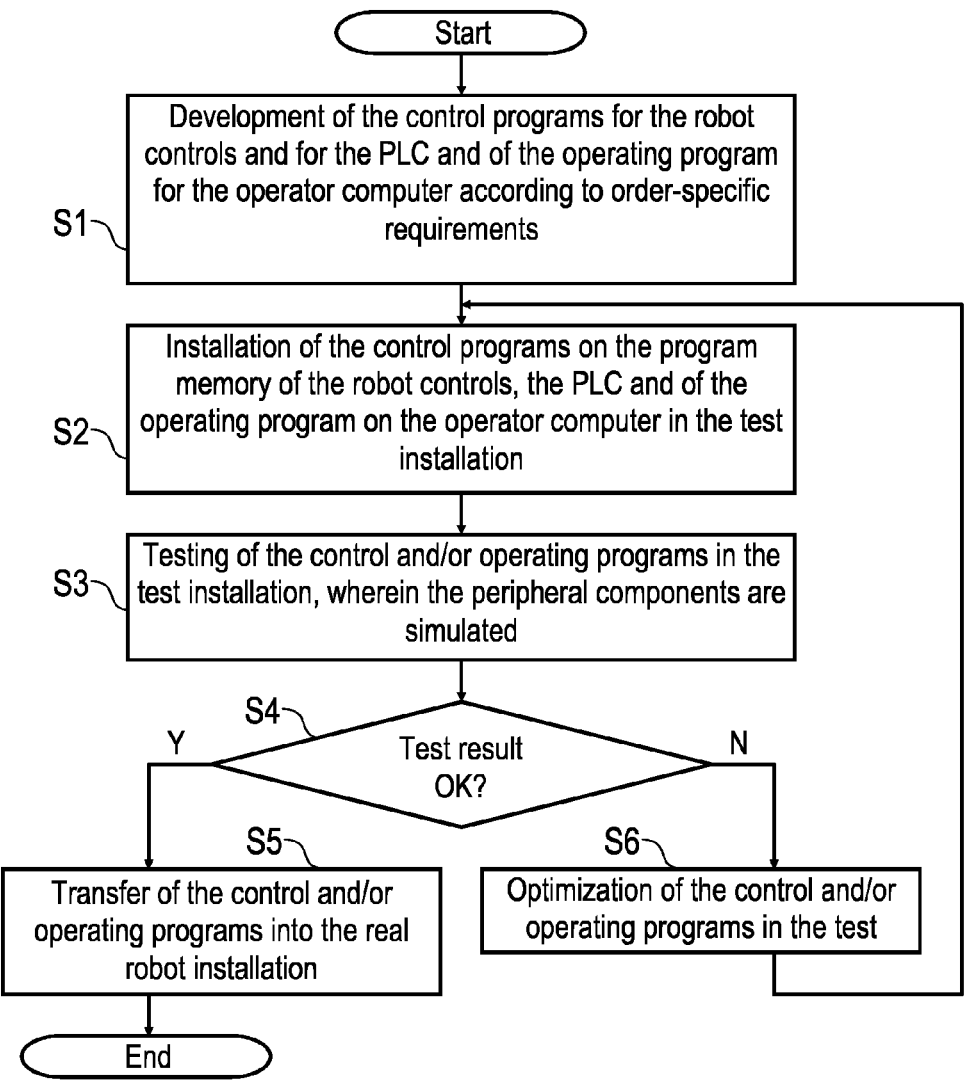
Figure 5:
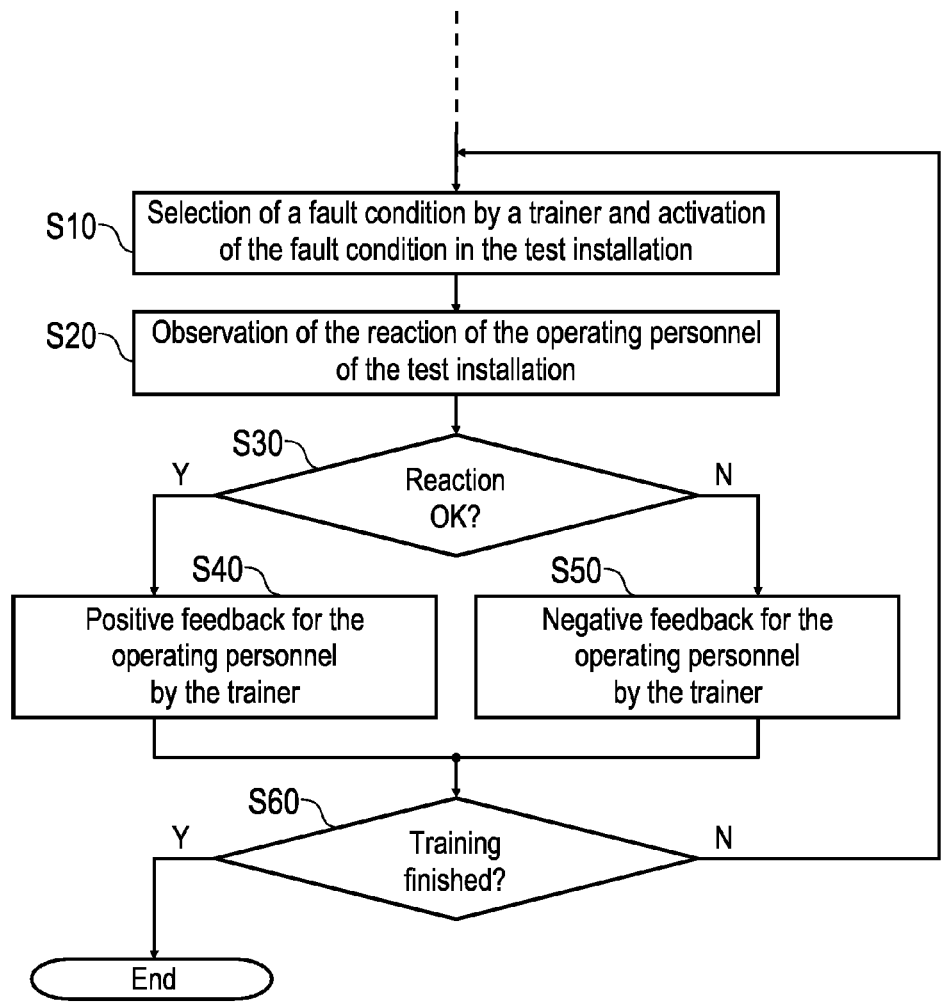
Figure 6:
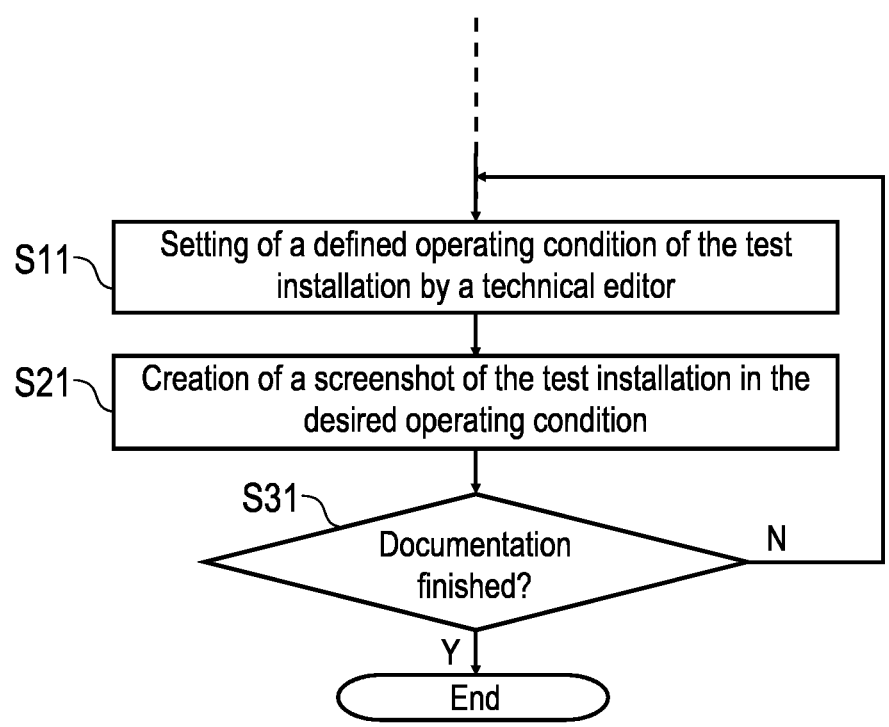

Other advantageous developments explained in more detail below together with the description of the figures. The figures show as follows:

FIG. 1 is a schematic representation of a test installation for testing control software for a painting installation, FIG. 2 is a modification of the test installation according to FIG. 1, wherein the robots in the painting installation are each simulated or modelled by a modelling equipment, FIG. 3 is a modification of the test installation according to FIG. 1, wherein the test installation only has a single robot control on which a multi-robotic software is running, FIG. 4 illustrates an exemplary test method in the form of a flow diagram, FIG. 5 illustrates the use of a test method as part of training operation of the installation, in the form of a flow diagram, FIG. 6 a flow diagram which illustrates an exemplary use of a test method for documentation purposes.

FIG. 7 illustrates the initially described conventional painting installation according to the prior art.

FIG. 1 shows an exemplary embodiment of a test installation for testing control software for a painting installation, wherein the test installation closely corresponds to the structure and functionality of the real painting installation, as shown in FIG. 7 and which has already been described above. In order to avoid repetition, reference is made to the above description of the painting installation, wherein the same reference numerals are used for corresponding details of respective components.

One particularity of the test installation is that a modelling equipment 9 is provided instead of the peripheral components 5, wherein the modelling equipment 9 simulates or models the real peripheral components 5 and therefore replaces them within the context of the test installation. This offers the advantage that the real peripheral components 5 do not have to be present in the test installation. New peripheral components can be integrated into the test installation as the real components for testing purposes. In this way, the control software can be tested at the same time with both real and simulated or modelled peripheral components.

One further particularity of the test installation compared to the real painting installation is that the robot controls 2.1, 2.2, ..., 2.n are not connected with the real robots 1.1, 1.2, ..., 1.n. Instead, the control software simulates the behavior of the real robots 1.1, 1.2, ..., 1.n in the robot controls 2.1, 2.2, ..., 2.n. This offers the advantage that the test installation can manage without the real robots 1.1, 1.2, ... 1.n.

FIG. 2 shows a modification of the test installation according to FIG. 1, such that, to avoid repetition, reference is made to the above description, the same reference numerals being used for corresponding details.

One particularity of this exemplary embodiment is that the robot controls 2.1, 2.2, ..., 2.n are each connected with a modelling equipment 10.1, 10.2, ..., 10.n, wherein the individual items of modelling equipment 10.1, 10.2, ..., 10.n each model or simulate one of the real robots 1.1, 1.2, ..., 1.n in the painting installation.

FIG. 3 shows a further modification of the test installation according to FIG. 1, such that, to avoid repetition, reference is made to the above description, the same reference numerals being used for corresponding details.

One particularity of this exemplary embodiment is that the robot control 2 is the only robot control, wherein a Multi-Robotic software is running on the robot control 2, which simulates the behavior of the various robots 1.1, 1.2, ..., 1.n in the painting installation.

FIG. 4 shows an exemplary test method in the form of a flow diagram.

In a first step S1, the control programs for the robot controls 2.1, 2.2, ..., 2.n and for the central control unit 4 (for example a PLC), are initially developed according to order-specific requirements of the respective customer. The visualization on the operator computer 6 usually also includes an order-specific adapted software, which must be created and tested.

In a step S2, the developed control programs are then installed on the program memory unit of the robot controls 2.1, 2.2, ..., 2.n and the central control unit 4 (for example a PLC) in order for the control programs to be subsequently tested in the test installation, which occurs in a step S3.

The testers then check, in a step S4, as part of the test method, whether the test result is OK. It is preferable that the testers are not the program developers.

If this is the case, then the control programs are ready to be worked with, and they are transferred in a step S5 into the real robot installation.

In all other cases, the test programs are further optimized in a step S6 by the developers and—from step S3 on—tested again.

FIG. 5 shows the use of an exemplary test method as part of a training operation to train future operating personnel for the painting installation.

In a step S10, a trainer then selects a fault condition and activates the fault condition in the test installation. It is necessary to mention here that this description only comprises testing of the operating personnel but not the prior training on the test installation, which also takes place.

In a subsequent step S20, the trainer observes the reaction of the operating personnel to the behavior of the test installation.

In a step S30, there is then checking as to whether the reaction of the operating personnel to the fault condition was correct.

If this was the case, then the trainer gives the future operating personnel positive feedback in a step S40.

Otherwise, the trainer gives the future operating personnel negative feedback in a step S50 in order to improve the reaction of the future operating personnel.

In a step S60, checks are made to see whether the training should be terminated. The training operation is terminated if this is the case. The training operation will otherwise be continued with step S10.

Finally, FIG. 6 shows the use of a test method for documentation purposes.

In a step S11, a technical editor creates a certain operating condition of the test installation to document this.

In a step S21, the technical editor then creates a screenshot of the test installation in the desired operating condition in order to be able to adopt the screenshot into a technical documentation (for example an operating manual for the painting installation).

In a step S31, checks are made to see whether the documentation is complete. If this is not the case, then the steps S11 and S21 are repeated in a loop.

The invention is not limited to the exemplary embodiments described above. Instead, a plurality of variations and modifications is possible. The invention is intended to be limited only by the following claims.

The invention claimed is:

1. A test installation, comprising:
   a plurality of virtual robot controls that each contain a robot control program and correspond to real robot controls of a real robot installation;
   at least one virtual control unit for coordination of the virtual robot controls, wherein the at least one virtual control unit includes a control program and corresponds to a real control unit of the real robot installation,
   a first data bus and a second data bus, wherein the first data bus corresponds to a data bus of the real robot installation; and
   a modelling equipment that is connected to the first data bus and that is configured to simulate peripheral components of the real robot installation so that the control program can be tested without the peripheral components;
   wherein the first data bus connects to each other at least one of the virtual robot controls, the at least one virtual control unit, and the modelling equipment, wherein the first data bus corresponds to a data bus of the real robot installation,
   the second data bus connects the virtual robot controls to one another and to the virtual control unit, an operator computer, and a graphics computer, and,
   of the first data bus and the second data bus, the operator computer and the graphics computer are directly connected only to the second data bus.

2. The test installation of claim 1, further comprising a graphics computer that is configured for visualization of robots, wherein:
   the graphics computer is connected with the virtual robot controls and receives axial values from the virtual robot controls, wherein the axial values reproduce the positions of individual robot axes, and
   the graphics computer reproduces simulated movements of virtual robots on a screen.

3. The test installation of claim 1, wherein:
   an operator computer is provided to operate and monitor the test installation,
     the operator computer is connected with the virtual control unit and with the virtual robot controls, and
     the operator computer includes a visualization program used to visualize the test installation.

4. The test installation of claim 1, wherein the modelling equipment at least simulates one of the following peripheral components totally or partially:
   a conveyor system which transports components,
   a fire protection system,
   an air-conditioning system in a painting cabin of the painting installation,
   a compressed air supply to the robot installation,
   robots of the robot installation,
   sensors,
   actors,
   robots, and
   components which are housed in the real robot installation in a robot control cabinet.

5. The test installation of claim 1, wherein each of the first data bus and the second data bus is a field bus.

6. The test installation of claim 1, wherein the robot control program is configured to simulate sensors and actors included in robots.

7. The test installation of claim 1, wherein the modelling equipment is configured to simulate sensors and actors included in robots.

8. The test installation of claim 1, wherein:
   the real robot installation contains a same number of robot controls as the test installation such that each real robot control in the real robot installation may be simulated by a virtual robot control in the test installation.

9. A test installation, comprising:
   a single virtual robot control that contains a robot control program and that corresponds to a real robot control of a plurality of real robot controls in a real robot installation, wherein each of the real robot controls a robot;
   at least one virtual control unit for coordination of the virtual robot controls wherein the at least one control unit includes a virtual control program and corresponds to a real control unit of the real robot installation;
   a first data bus which connects the virtual robot controls with at least one of each other and the at least one virtual control unit, wherein the first data bus corresponds to a data bus of the real robot installation;
   a second data bus that connects the virtual robot controls to one another and to the at least one virtual control unit;
   a modelling equipment that is connected to the first data bus and that is configured to simulate peripheral components of the real robot installation so that the control program can be tested without the peripheral components; and
   an operator computer, and a graphics computer, wherein, of the first data bus and the second data bus, the operator computer and the graphics computer are directly connected only to the second data bus; further wherein
   the first data bus connects the virtual robot controls to the modelling equipment as well as to one another and to the at least one virtual control unit; and
   the control program in a single robot control in the test installation is fitted with multi-robot software that is configured to simulate a control for all robots in the real robot installation.

* * * * *